United States Patent
Cesareo et al.

(10) Patent No.: US 10,920,045 B2
(45) Date of Patent: Feb. 16, 2021

(54) ELASTOMERIC COMPOSITION COMPRISING GRAPHENE AND TIRE COMPONENTS COMPRISING SAID COMPOSITION

(71) Applicant: DIRECTA PLUS S.P.A., Como (IT)

(72) Inventors: Giulio Cesareo, Como (IT); Massimiliano Bianchi, Carate Brianza (IT); Antonino Di Pasquale, Milan (IT)

(73) Assignee: DIRECTA PLUS S.P.A., Como (IT)

( * ) Notice: Subject to any disclaimer, the term of this patent is extended or adjusted under 35 U.S.C. 154(b) by 60 days.

(21) Appl. No.: 15/747,146

(22) PCT Filed: Jul. 25, 2016

(86) PCT No.: PCT/EP2016/067618
§ 371 (c)(1),
(2) Date: Jan. 23, 2018

(87) PCT Pub. No.: WO2017/029072
PCT Pub. Date: Feb. 23, 2017

(65) Prior Publication Data
US 2018/0215904 A1    Aug. 2, 2018

(30) Foreign Application Priority Data

Aug. 14, 2015 (IT) ................. 102015000044735

(51) Int. Cl.
| | | |
|---|---|---|
| *C08K 3/04* | (2006.01) | |
| *C08K 3/36* | (2006.01) | |
| *B60C 1/00* | (2006.01) | |
| *B60C 5/00* | (2006.01) | |
| *C08L 9/00* | (2006.01) | |
| *C08L 9/06* | (2006.01) | |
| *C08L 7/00* | (2006.01) | |
| *C08L 23/16* | (2006.01) | |

(52) U.S. Cl.
CPC .............. *C08L 9/06* (2013.01); *B60C 1/00* (2013.01); *B60C 1/0008* (2013.01); *B60C 1/0016* (2013.01); *B60C 1/0041* (2013.01); *B60C 5/00* (2013.01); *C08K 3/04* (2013.01); *C08K 3/042* (2017.05); *C08K 3/36* (2013.01); *C08L 7/00* (2013.01); *C08L 9/00* (2013.01); *C08L 23/16* (2013.01); *B60C 2200/12* (2013.01); *C08L 2205/02* (2013.01); *C08L 2205/03* (2013.01); *C08L 2205/035* (2013.01)

(58) Field of Classification Search
None
See application file for complete search history.

(56) References Cited

U.S. PATENT DOCUMENTS

| | | | | |
|---|---|---|---|---|
| 3,411,970 | A  * | 11/1968 | Perrin | ............... C08J 5/10 |
| | | | | 156/297 |
| 7,923,491 | B2 * | 4/2011 | Weng | ............. B60C 1/0008 |
| | | | | 524/13 |
| 7,999,027 | B2 * | 8/2011 | Zhamu | ................ C08K 3/04 |
| | | | | 524/495 |
| 8,182,626 | B2 * | 5/2012 | Recker | ............. B60C 1/0016 |
| | | | | 156/110.1 |
| 9,090,756 | B2 * | 7/2015 | Du | ..................... C08K 3/04 |
| 10,077,279 | B2 * | 9/2018 | Rossle | ............... C08K 5/548 |
| 2006/0207700 | A1* | 9/2006 | Palombo | ................. B60C 1/00 |
| | | | | 152/209.1 |
| 2008/0302561 | A1 | 12/2008 | Prud'homme et al. | |
| 2010/0147188 | A1* | 6/2010 | Mamak | .............. B82Y 30/00 |
| | | | | 106/31.13 |
| 2013/0150516 | A1* | 6/2013 | Lettow | ................... C08K 3/04 |
| | | | | 524/495 |
| 2014/0079932 | A1* | 3/2014 | Aksay | ................ B82Y 30/00 |
| | | | | 428/219 |
| 2014/0155544 | A1 | 6/2014 | Du et al. | |
| 2015/0018481 | A1 | 1/2015 | Mruk et al. | |

FOREIGN PATENT DOCUMENTS

| | | |
|---|---|---|
| CN | 101460393 A | 6/2009 |
| CN | 102026916 A | 4/2011 |
| CN | 104136237 A | 11/2014 |

OTHER PUBLICATIONS

Abd Razak J; Haji Ahmad S; Ratnam C T; Mahamood M A; Mohamad N; "Effects of poly(ethyleneimine) adsorption on graphene nanoplatelets to the properties of NR/EPDM rubber blend nanocomposites", Journal of Materials Science, vol. 50, No. 19, Jun. 26, 2015 (Jun. 26, 2015), pp. 6365-6381, XP002755434, p. 6367-p. 6368; tables 1, 3.
ISA Search Report and Written Opinion, PCT/EP2016/067618, filed Jul. 25, 2016.
Yan N; Buonocore G; Lavorgna M; Kaciulis S; Balijepalli S K; Zhan Y; Xia H; Ambrosio L: "The role of reduced graphene oxide on chemical, mechanical and barrier properties of natural rubber composites", vol. 102, No. 1, Jul. 27, 2014 (Jul. 27, 2014), pp. 74-81, XP002755435, p. 75, figure 4.

* cited by examiner

*Primary Examiner* — Tae H Yoon
(74) *Attorney, Agent, or Firm* — Renaissance IP Law Group, LLP; David A. Crowther

(57) ABSTRACT

Elastomeric composition for producing tire components comprising, based upon parts by weight per 100 parts by weight of rubber (phr):
(A) 100 phr of a blend of rubber comprising at least 20% by weight of an isoprene polymer;
(B) from 0 to 30 phr of silica;
(C) from 0 to 50 phr of amorphous carbon black;
(D) from 1 to 40 phr of graphene,
wherein the graphene consists of graphene nanoplatelets, wherein at least 90% have a lateral size (x, y) from 50 to 50000 nm and a thickness (z) from 0.34 to 50 nm, wherein the lateral size is always greater than the thickness (x, y>z), and wherein the C/O ratio is ≥100:1.

12 Claims, 4 Drawing Sheets

ELASTOMERIC COMPOSITION COMPRISING GRAPHENE AND TIRE COMPONENTS COMPRISING SAID COMPOSITION

RELATED APPLICATION DATA

This application is a 371 of international Application No. PCT/EP2016/067618, filed on Jul. 25, 2016, which claims priority from Italian Patent Application No. 102015000044735, filed on Aug. 14, 2015.

The present invention relates to an elastomeric composition comprising graphene and to tire components comprising said composition.

BACKGROUND

The various components of a tire, such as the carcass, the inner tube and the tread, typically comprise one or more elastomers mixed to additives and fillers so as to optimize the performance according to the specific function that the component of the tire is required to perform. For example, rolling resistance and wet grip are fundamental properties for the tread, while gas permeability is a fundamental property of the inner tube or of the carcass.

There is a great deal of industrial research in this field and many elastomeric compositions have been produced, published and marketed with the aim of continually improving the performance of tires for motor vehicle, motorcycle and bicycle tires.

Elastomeric compositions comprising graphene for producing tire components are also known from the patent literature.

US 2014/0155544 A1 describes an elastomeric composition for tires comprising a diene-based elastomer, silica and exfoliated graphene particles, obtained by the intercalation of graphite with an oxidizing agent and subsequent exfoliation. The graphene thus obtained is in oxide form and can be reduced, for example, with hydrazine, but the degree of reduction is not described.

The graphene in oxidized form, just as that in the form obtained through reduction of graphene oxide ("GO"), has different characteristics and properties to pristine graphene. For example, the electrical and thermal conductivity characteristics and the mechanical strength of the pristine graphene are superior to those of GO and to the reduction product obtained from it, also due to the presence of numerous reticular defects and imperfections of the crystalline structure caused by the reduction reaction.

With regard to application in the field of tires, WO 2014/0155544 A1 mentions improvements in thermal conductivity and reduced hysteresis, resulting in an improvement of the rolling resistance. However, improvement of the rolling resistance alone is not a satisfactory result unless accompanied by maintenance or improvement of the wet grip, it being well known that these two properties are in opposition and, as a rule, an improvement of one leads to a worsening of the other.

SUMMARY OF THE INVENTION

Therefore, an object of the present invention is to provide an elastomeric composition comprising graphene having improved properties, particularly suitable to be used in the manufacture of tire components and therefore adapted to optimize the balance of properties between rolling resistance and wet grip.

Therefore, an aspect of the present invention relates to an elastomeric composition comprising, based upon parts by weight per 100 parts by weight of rubber (phr):

(A) 100 phr of a blend of rubbers comprising at least 20% by weight of isoprene polymer;
(B) from 0 to 30 phr of silica;
(C) from 0 to 50 phr of amorphous carbon black;
(D) from 1 to 40 phr of graphene, characterized in that said graphene comprises graphene nanoplatelets, wherein at least 90% have a lateral size (x, y) from 50 to 50000 nm and a thickness (z) from 0.34 to 50 nm, wherein the lateral size is always greater than the thickness (x, y>z), and wherein the C/O ratio is $\geq 100:1$.

In an embodiment, the blend of rubbers (A) comprises, besides the isoprene polymer, also a styrene-butadiene polymer (SBR).

In an embodiment, the blend of rubbers (A) comprises, besides the isoprene polymer and a styrene-butadiene polymer (SBR), also a 1,3-butadiene polymer (PB).

In another embodiment, the blend of rubbers (A) comprises, besides the isoprene polymer and the styrene-butadiene polymer (SBR), also an ethylene-propylene-diene terpolymer (EPDM).

Another aspect of the invention relates to a tire component comprising the elastomeric composition defined above.

In an embodiment, said tire component is the tread.

In a particular embodiment, said component is the tread of a bicycle tire.

In another embodiment, said tire component is an inner tube, a carcass, a tubeless tire or an inner liner of the tubeless tire.

DESCRIPTION OF THE INVENTION

Figure 1:
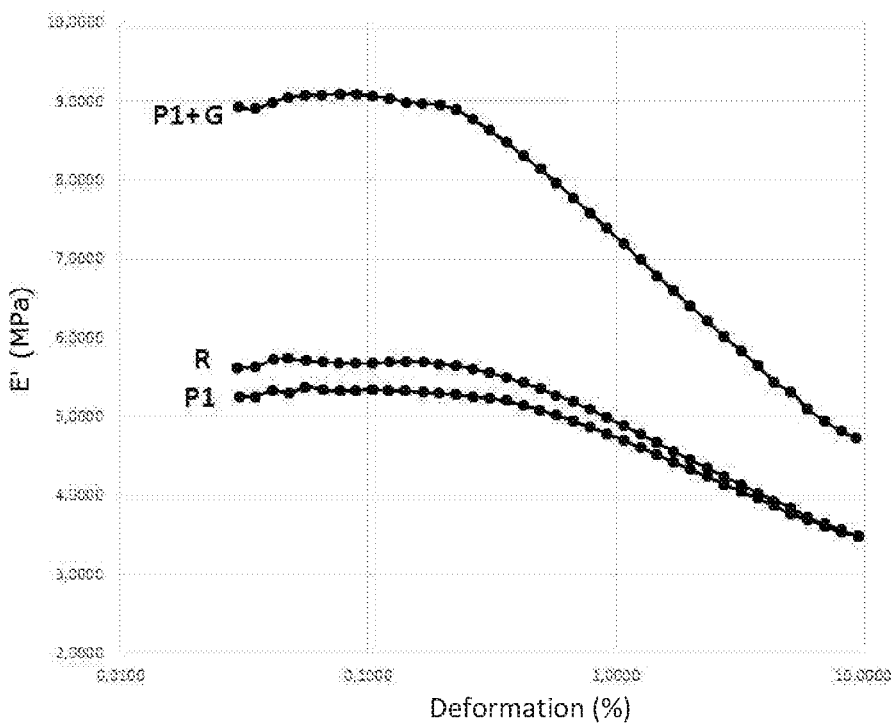
FIGS. 1 and 2 highlight a technical effect deriving from interaction between graphene nanoplatelets representing component (D) and elastomeric matrix (A).

It is known that a tire, whether for a motor vehicle, a motorcycle or a bicycle, must have characteristics and properties that ensure, among other things, good rolling resistance, in order to reduce the energy consumption thereof, and good wet grip, in order to ensure road-holding in the worst conditions of the road surface. It is known that these properties are substantially in opposition, so that improving one worsens the other.

However, it has surprisingly been found that the use of a certain type of graphene in a certain type of elastomeric composition allows an improvement in the balance of properties between rolling resistance and wet grip, i.e. allows a good compromise to be reached between the values of these parameters without having a particular negative impact on either.

Graphene is a material formed by a single atomic layer of $sp^2$ hybridized carbon atoms. Therefore, they are arranged in highly crystalline and regular hexagonal close-packed honeycomb structures.

Scientific and patent literature describes various methods for the preparation of graphene, such as chemical vapour deposition, epitaxial growth, chemical exfoliation and chemical reduction of the oxidized form graphene oxide (GO).

The Applicant Directa Plus S.p.A. is the holder of European patent EP 2 038 209 B1, which describes, among other things, a method for producing structures comprising graphene layers, obtained by intercalation and subsequent expansion/exfoliation of graphite.

The Applicant Directa Plus S.p.A. is also the holder of International patent application PCT/2015/063397, which describes methods for producing aqueous dispersions of pristine graphene, from which it is possible to obtain graphene nanoplatelets with a C/O ratio ≥100:1, and also ≥200:1. This ratio is important as it defines the maximum amount of oxygen bonded to the carbon forming the graphene. It is in fact known that the best properties of graphene, which derive from its high crystallographic quality, are obtained when the amount of oxygen is minimum.

A pristine graphene, i.e. with a C/O ratio ≥100:1, absence or minimum presence of reticular defects—detected using Raman spectroscopy—minimum presence or absence of extraneous substances, including surfactants or functionalizing agents or coupling agents of the graphene, forms a fundamental component for improving the properties of an elastomeric composition to be used for the manufacture of tire components.

The C/O ratio in the graphene used in the elastomeric composition according to the invention is determined by elementary analysis performed by Inductively Coupled Plasma Mass Spectrometry (ICP-MS), which provides the percentage by weight of the various elements. By normalizing the values obtained with respect to the atomic weight of the C and O species and finding their ratio, the C/O ratio is obtained.

The reticular defects of the nanoplatelets can be evaluated using Raman spectroscopy by analysing the intensity and shape of the Peak D positioned at 1350 $cm^{-1}$.

According to preferred embodiments described in the patent documents mentioned above by the Applicant Directa Plus S.p.A., the process for producing pristine graphene is carried out in a continuous way by continuously feeding graphite flakes to the high temperature expansion step, continuously discharging the so-obtained expanded graphite in an aqueous medium and continuously subjecting the expanded graphite dispersed in the aqueous medium to the exfoliation and size reduction treatment carried out with the methods of ultrasonication and/or high pressure homogenization.

This process for producing pristine graphene comprises several steps.

The first step of the process consists in the preparation of expanded and/or exfoliated graphite starting from intercalated graphite.

The intercalated graphite can be prepared with methods known to those skilled in the art or purchased on the market. The expansion step of the intercalated graphite is performed by exposing flakes of intercalated graphite (Graphite Intercalation Compounds, GICs) having a lateral size ≤500 μm to a temperature from 1300 to 12000° C. for a time of less than 2 seconds. This treatment is performed as described in the patent EP 2038209 B1, i.e. by generating heat within the GICs, preferably using an electric arc, a microwave or high frequency induction furnace or by forming plasma. This last treatment is particularly preferred as it is possible to reach the temperature required associated with high turbulence.

The second step of the process comprises collecting the expanded graphite obtained in the first step and dispersing it in an aqueous medium, just after its formation.

Preferably, the expanded graphite is precipitated by gravity in a receptacle containing an aqueous medium in the absence of a surfactant or in the presence of a surfactant in an amount of less than 1% by weight of the weight of said graphite.

Contrary to the teachings of the prior art, if the expanded graphite just formed is added to an aqueous medium, optimal dispersion can be obtained without requiring to use a surfactant.

Obtaining an excellent aqueous dispersion of expanded graphite without the aid of surfactants represents an important advantage, both due to the decrease in costs resulting from saving on surfactant, and due to the improved properties of the end product, as will be better explained in the description below. However, a small amount of surfactant, less than 1% by weight, can be used without any significant decrease in the quality of the end product.

If dispersion of the expanded graphite is carried out in the presence of a surfactant, the surfactant is preferably an anionic surfactant, more preferably an anionic surfactant in which the anion forming the hydrophilic polar group is selected from sulfonate, sulphate, carboxylate and the hydrophobic nonpolar part is selected from structures comprising aromatic rings such as benzene, naphthalene, pyrene or cyclic aliphatic structures such as derivatives of cholic acid. A preferred surfactant is sodium benzenesulfonate.

Dispersion is obtained by light stirring.

The expanded graphite is dispersed in water at a concentration from 0.5% to 5% by weight, preferably from 1% to 4% by weight, more preferably from 2% to 3% by weight.

The third step of the process has the object of obtaining exfoliation and size reduction of the expanded graphite to obtain pristine graphene nanoplatelets, at least 90% of which have a lateral size (x, y) from 50 to 50,000 nm and a thickness (z) from 0.34 to 50 nm, the lateral size being greater than the thickness (x, y>z).

This exfoliation and size reduction is obtained by subjecting the dispersion of the graphite in water, in which there is no surfactant or with an amount of surfactant of less than 1% by weight, to treatment with ultrasounds or to high pressure homogenization treatment in which the particles of expanded graphite are caused to collide.

The treatment with ultrasounds is carried out at an energy level from 10 to 200 Wh per gram of expanded graphite obtained in the preceding step.

Preferably the treatment of the aqueous dispersion of expanded graphite with ultrasounds is performed at an energy level of from 10 to 100 Wh per gram. The treatment with ultrasounds is performed using apparatus such as commercial ultrasonicators for treating liquids, where the acoustic energy is transmitted to the system by cavitation (formation and explosion of bubbles) using a sonotrode immersed in the liquid, with wave frequency of around 24 kHz, and with power as defined above.

The combination of the expansion treatment of the intercalated graphite at high temperature and of the subsequent ultrasonication treatment in a water medium enables both an exfoliation of the graphite and a reduction in the size thereof to be performed, obtaining graphene nanoplatelets directly dispersed in water, in relatively rapid times.

The high pressure homogenization treatment is performed with a homogenizer in which the dispersion of expanded graphite is pumped at a pressure above 35 MPa through one or more micro-channels or necks. Here the particles in dispersion are subjected to very high shear stresses, deriving from the sudden pressure drop, and to collision with one another and with the surfaces of these micro-channels or necks.

It must be specified that the term "neck" is intended as a reduction of the cross section of the duct substantially in one point through which the dispersion is forced to flow, while the term "micro-channel" is intended as a neck that extends in the direction of flow of the dispersion of particles.

This treatment allows a substantial size reduction of the expanded graphite to be obtained, up to the values according to the axes x, y and z mentioned previously. These necks can be of static type, such as flow channels having a maximum size of 500 μm, or of dynamic type, such as valves with a section that is adjustable so as to define a neck having a maximum size of 500 μm.

High pressure homogenization apparatus using necks of static type are marketed by Microfluidics International Corporation (Newton, Mass., U.S.A.) with the trade name Microfluidizer®. In these apparatus, the dispersion of expanded graphite is pumped at a pressure above 35 MPa through a plurality of flow channels having a maximum size of 500 μm, in which the particles of expanded graphite are caused to collide. Preferably, the maximum pressure is 500 MPa. The structure and the operation of this apparatus are also described, among other things, in the U.S. Pat. No. 8,367,004 B2.

High pressure homogenization apparatus using necks of dynamic type are marketed, among other things, by GEA NIRO-Soavi (Parma, Italy). The structure and the operation of these apparatus are also described, among other things, in the U.S. Pat. No. 4,773,833.

According to the amount of size reduction required, it is possible to treat the aqueous dispersion of expanded graphite several times in the homogenizer. This can be carried out in a continuous way, with various cycles through the homogenizer.

Preferably the high pressure homogenization treatment is performed in a homogenizer in which the dispersion of expanded graphite is pumped at a pressure above 100 MPa through one or more micro-channels or necks.

As mentioned previously, the final dispersion of the graphene nanoplatelets obtained after the exfoliation and size reduction treatment carried out with one or more of the methods defined above can be concentrated or dried, depending on the final form required for the graphene.

Concentration of the dispersion can be carried out with techniques known to those skilled in the art, such as removal of the water by evaporation, filtration or centrifugation. The absence—or minimum presence (less than 1%)—of surfactant allows the problem of its possible polymerization to be avoided and makes it possible to operate with higher temperatures, as well as to guarantee the feasibility of liquid-solid separation.

Using the techniques indicated above, it is possible to increase the concentration of the dispersion up to 30% by weight. The product that is obtained in a range of concentrations from 6 to 30% by weight has a high viscosity and the consistency of a paste, and can advantageously be used as masterbatch for water-based formulations.

The advantages deriving from the use of a concentrated dispersion in the range from 6 to 30% by weight are: 1) freedom of formulation, i.e. the possibility to dilute the product to the desired concentration and to choose the best surfactant for the specific application; 2) high dispersibility due to the presence of residual water that, interposed between the graphene nanoplatelets, weakens the Van der Waals bonds that are established between them; 3) possibility to use the product directly by spreading on the desired substrate; 4) confinement of the graphene nanoplatelets in a matrix, facilitating their handling and transport.

A particularly advantageous method of concentrating the dispersion is that of filtration with removal of the water until obtaining a dispersion having a concentration in the desired range on the filter. The filtration system is controlled by adjusting on the treatment time and the filtration pressure. The filters are defined according to the surface area of the filter. A suitable filter system is one marketed with the trade name Funda® by Mavag AG.

The object of drying the dispersion is to obtain a dry powder that is easily redispersible in various matrices, both solvents and polymers, where liquid is not desirable or manageable at process level, or where water cannot be used due to chemical incompatibility.

The dispersion can be evaporated to dryness using prior art techniques, such as lyophilisation, evaporation in a rotating evaporator or spray drying. In any case, the graphene nanoplatelets produced in the absence of a surfactant exhibit a high degree of dispersibility. Moreover, on the one hand the low oxygen content and the absence of reticular defects ensure high physical and chemical properties and on the other guarantee the permanent absence of stable re-agglomeration of the nanoplatelets, due to a chemical interaction of covalent type. The high aspect ratio (high lateral size and low thickness) ensures optimal performances in terms of electrical and thermal conductivity and barrier property.

A very important advantage of the process described consists in the possibility of operating without surfactant. In fact, the graphene nanoplatelets thus obtained are highly pure, both due to the high C/O ratio and to the absence of extraneous substances that end up being contaminants, such as surfactants. In fact, it has been found that in the absence of surfactants it is possible to obtain graphene having substantially higher electrical conductivity than that of graphene obtained with processes that use surfactants. This improves the performance of the graphene in a plurality of applications.

Pristine graphene nanoplatelets, at least 90% of which have a lateral size (x, y) from 50 to 50,000 nm and a thickness (z) from 0.34 to 50 nm, the lateral size being greater than the thickness (x, y>z), having a C/O ratio ≥100:1, have a high electrical conductivity. The electrical conductivity is determined on a film obtained by depositing an aqueous dispersion of said nanoplatelets on a glass substrate forming a film of 1 cm×1 cm and dried using a heating plate at 100° C. for 15 minutes, and is measured in a Van der Pauw configuration. This film has an electrical conductivity ≥1500 S/m, preferably ≥2000 S/m.

It was also seen that when a dispersion of graphene nanoplatelets is formed in the presence of a surfactant, this deposits on the surface thereof and tends to promote its agglomeration.

In the present description the size of the graphene nanoplatelets is defined with reference to a system of Cartesian axes x, y, z, it being understood that the particles are substantially flat platelets but may also have an irregular shape. In any case, the lateral size and the thickness provided with reference to the directions x, y and z must be intended as the maximum sizes in each of the aforesaid directions.

The lateral sizes (x, y) of the graphene nanoplatelets are determined by direct measurement on the scanning electron microscope (SEM), after having diluted the final dispersion in a ratio of 1:1000 in deionized water and added it dropwise to a silicon oxide substrate placed on a plate heated to 100° C. using laser diffraction (see for example Malvern) for statistical measurement. The thickness (z) of the graphene nanoplatelets is determined with the atomic force microscope (AFM), which is essentially a profilometer with subnanometer resolution, widely used for characterization (mainly morphological) of the surfaces and of the nanomaterials. This type of analysis is commonly used (both for academic purposes and in industrial R&D) to evaluate the thickness of the graphene flakes, produced with any method, and to detect the number of layers forming the flake (single layer=0.34 nm).

The nanoplatelets of the final dispersion, deposited as described for SEM analysis, are scanned directly with an AFM tip, where the measurement provides a topographical image of the graphene flakes and their profile with respect to the substrate, enabling precise measurement of the thickness.

The final dispersion of the graphene nanoplatelets obtained after the exfoliation and size reduction treatment carried out with one or more of the methods b1) and b2) defined above can advantageously be concentrated or dried, depending on the final form required for the graphene.

In the concentrated final dispersion or in the dry form obtained after drying, at least 90% of the graphene nanoplatelets preferably have a lateral size (x, y) from 100 to 25,000 nm, more preferably from 500 to 15,000 nm, and preferably a thickness (z) from 0.34 to 20 nm, more preferably from 0.34 to 8 nm.

The graphene nanoplatelets obtained with the aforesaid characteristics of size and purity, therefore with a very low oxygen content, as defined by the aforesaid C/O ratio and not functionalized with other molecules, have proved to be particularly suitable for use as a component in elastomeric compositions for tires, where it is possible to achieve desired properties such as: i) improvement of the mechanical dynamic properties, in particular the balance between rolling resistance and wet grip; ii) an improved gas barrier effect, with consequent increase of impermeability, causing the tire to deflate more slowly; iii) increase of thermal conductivity, useful for heat dissipation; iv) increase of electrical conductivity, useful for the dissipation of electrostatic energy.

The graphene nanoplatelets having the aforesaid characteristics form component (D) of the elastomeric composition according to the invention.

Component (A) of the elastomeric composition according to the invention is a blend of rubbers comprising at least 20% by weight of an isoprene polymer (NR) and optionally one or more of the following polymers: a 1,3-butadiene polymer (PB), a styrene-butadiene copolymer (SBR), an ethylene-propylene-diene terpolymer (EPDM).

In the present description, the term "rubber" and the term "elastomer" are used with the same meaning and are therefore interchangeable, unless otherwise specified.

In the present description the term "phr" indicates the parts by weight of a component with respect to 100 parts by weight of elastomer (A).

The isoprene polymer can consist of natural rubber (NR), which is cis-1,4-polyisoprene, but naturally it can also be obtained by synthesis polymerizing the isoprene monomer alone in the stereospecific form in order to obtain a 1,4-cis configuration only. It is also possible to polymerize the isoprene with 1,3-butadiene, obtaining an isoprene-butadiene copolymer, or to polymerize isoprene with styrene, obtaining an isoprene-styrene copolymer.

The 1,3-butadiene polymer is polybutadiene (PB), which contains the three typical configurations: 1,2-vinyl, 1,4-cis, 1,4-trans in variable ratios. Polybutadiene with a very high content of 1,4-cis units is particularly preferred.

The styrene-butadiene polymer (SBR) is obtained through copolymerization of styrene and butadiene in solution or suspension. The copolymer obtained with the solution process is given the abbreviation S-SBR and is particularly useful for producing tires. The solution process of the production of S-SBR elastomers allows targeted ratios to be obtained between the two monomers (butadiene and styrene) and in particular it is possible to obtain in the butadiene phase a variable content of the 1,2-vinyl configuration. The SBR copolymer can also comprise other monomers, such as isoprene, and can therefore be a styrene-butadiene-isoprene terpolymer.

As stated, component (A) of the elastomeric composition according to the invention can optionally also comprise an EPDM terpolymer, also called EPDM rubber. These are terpolymers obtained from the copolymerization of ethylene, propylene and a diene. The dienes generally used are dicyclopentadiene (DCPD), ethylidene norbornene (ENB) and vinyl norbornene (VNB). The content of ethylene typically varies from 45 to 75% by weight and the content of diene typically varies from 2.5% to 12% by weight.

The aforesaid polymers are available commercially and in any case their preparation processes are well known to those skilled in the art.

Component (B) of the elastomeric composition according to the invention consists of from 5 to 30 phr of silica. The silica can be synthetic amorphous silica obtained by precipitation, as used as a rule in compounds for rubber and as is known to those skilled in the art. Precipitated silica is preferred.

Precipitated silica aggregates are typically obtained from acidification of a soluble silica, for example sodium silicate and can include co-precipitated silica and a smaller amount of aluminum.

These silicas are characterized by a surface area BET, measured using nitrogen, preferably in the range from 40 to 600 m$^2$/g, more preferably in the range from 50 to 300 m$^2$/g. The BET method of measuring the surface area is described in the Journal of American Chemical Society, volume 60, page 309 (1938), and in the ASTM D5604 method for precipitated silica. Various precipitated silicas available on the market can be considered for use in the composition according to the invention, such as silicas marketed by PPG Industries with the trade name Hi-Sil with the names Hi-Sil 210, Hi-Sil 243; silicas marketed by Rhodia, such as Zeosil 1165MP and Zeosil 165gr, silicas marketed by Degussa AG, for example, with the names VN2 and VN3, and other types of silica, as is known to those skilled in the art for reinforcing rubber for tires.

Component (C) of the elastomeric composition according to the invention consists of from 10 to 50 phr of amorphous carbon black, as is known to those skilled in the art for reinforcing rubber for tires.

The elastomeric composition according to the invention can comprise other components besides components (A), (B), (C) and (D), such as additives, process agents, antioxidants, plasticizers, and comprises the substances required for vulcanization, such as cross-linking agents and accelerants, as is known to those skilled in the art.

In an embodiment of the invention, the elastomeric composition is used for the manufacture of a tread for a bicycle tire.

In an embodiment for producing a tread, component (A) comprises at least 50% by weight of a blend of an isoprene polymer and a styrene-butadiene polymer (SBR).

In an embodiment for producing a tread, component (A) comprises at least 50% by weight of a blend of an isoprene polymer, a styrene-butadiene polymer (SBR) and a 1,3-butadiene polymer (PB).

In another embodiment for producing a tire tread, component (A) comprises at least 50% by weight represented by the sum of an isoprene polymer and a styrene-butadiene polymer (SBR), and at least 30% by weight represented by an EPDM elastomer.

Preferred embodiments of the elastomeric composition according to the invention for producing tire treads comprise from 10 to 30 phr of silica (Component B) and from 10 to 50 phr of amorphous carbon black (Component C) and from 2 to 20 phr of graphene nanoplatelets (Component D).

More preferably these embodiments of the elastomeric composition for producing tire treads comprise from 10 to 20 phr of silica (Component B), from 15 to 40 phr of amorphous carbon black (Component C) and from 4 to 10 phr of graphene nanoplatelets (Component D).

The specific compound for the tread is made up and subsequently, through an extrusion or calendering process, strips are produced with sizes that vary according to the size of the tire to be produced, where generally the thickness is in the order of millimetres and the width is in the order of centimetres. Subsequently, this strip is coupled to the other parts that form the tire with procedures known to those skilled in the art.

In another embodiment the elastomeric composition according to the invention is used for applications in which it is important to reduce gas permeability.

Examples of this application are an inner tube of a tire, a tubeless tire, an inner liner of the tubeless tire and a carcass for bicycle tires.

In a preferred embodiment of the elastomeric composition for producing inner tubes for tires, component (A) comprises at least 50% by weight of an isoprene polymer, more preferably at least 80% of this polymer, and from 5 to 35 phr of graphene nanoplatelets (Component D).

The examples below illustrate some embodiments of the invention and are provided by way of non-limiting example.

EXAMPLES

Example 1

Preparation of a Tire Tread

In all the examples an elastomeric composition, also called "compound", was prepared in a closed laboratory mixer with a two-step process. The first step, lasting for a total of 5 to 6 minutes, consists in the preparation of the master, which comprises all the components except for the accelerants and cross-linking agents. The second step consists in the addition, again in a closed internal mixer, of the accelerants and cross-linking agents for 90 seconds, with subsequent vulcanization.

Three reference compositions, i.e. without the addition of graphene nanoplatelets, and three corresponding compositions according to the invention, represented by the reference compositions with the addition of graphene in nano-platelet form, i.e. component (D), were prepared.

The reference compositions are named R, P1 and P6 and the corresponding compositions according to the invention, i.e. with component (D), are named R+G, P1+G and P6+G, respectively.

The reference composition R is a typical commercial compound for racing bicycle tires, while the reference compositions P1 and P6 are experimental compositions produced to evaluate the effects of the addition of graphene.

The compositions obtained at the end of the two-step preparation process are illustrated in Table 1, where the ingredients are expressed as parts by weight per 100 parts by weight (phr) of rubber.

TABLE 1

|   |   | R | R + G | P1 | P1 + G | P6 | P6 + G |
|---|---|---|---|---|---|---|---|
| A | Natural Rubber | 25 | 25 | 70 | 70 | 40 | 40 |
|   | High cis polybutadiene | — | — | — | — | 30 | 30 |
|   | S-SBR | 45 | 45 | 30 | 30 | 30 | 30 |
|   | EPDM | 39 | 39 | — | — | — | — |
| B | Silica | 15 | 15 | 15 | 15 | 15 | 15 |
| C | Carbon black | 30 | 30 | 30 | 30 | 30 | 30 |
| D | Graphene | — | 6 | — | 6 | — | 6 |
|   | Polyolefin blend | 6 | 6 | 4 | 4 | 5 | 5 |
|   | Plasticizing oil | 9 | 12 | 2 | 5 | 2 | 5 |
|   | Blend of fatty acids | 5.5 | 5.5 | 5 | 5 | 5 | 5 |
|   | Anti-aging agent | 1 | 1 | 1 | 1 | 1 | 1 |
|   | Zinc oxide | 5 | 5 | 5 | 5 | 5 | 5 |
|   | Stearic acid | 1 | 1 | 1 | 1 | 1 | 1 |
|   | Microcrystalline wax | 1 | 1 | 4 | 4 | 4 | 4 |
|   | Zinc stearate | 2 | 2 | — | — | — | — |
|   | Low molecular weight polyethylene | 1 | 1 | 1 | 1 | 1 | 1 |
|   | Anti-ozonant | — | — | 6 | 6 | 6 | 6 |
|   | Accelerants | 3.7 | 3.7 | 2.5 | 2.5 | 2.5 | 2.5 |
|   | Cross-linking agents | 2 | 2 | 2.5 | 2.5 | 2.5 | 2.5 |

The graphene, component D, has lateral sizes (x-y), expressed as D90, from 10,000 to 15,000 nm and thickness (z) from 0.34 to 4 nm, and is manufactured by Directa Plus S.p.A. and marketed with the trade name Grafityre Pure G+.

The physical-mechanical properties of the compositions were then evaluated and subsequently these compositions were used to produce strips with a width of around 3 cm and thickness of around 2 mm, which are the sizes of a tread of a racing bicycle tire. The tread was then coupled to the other components that form the racing tire of the size 700×23 C, as is known to those skilled in the art, in order to evaluate the dynamic rolling resistance and the grip of the tire.

Analysis of the dynamic mechanical properties was focused on evaluation of the properties related to the behaviour of the material in terms of rolling resistance and wet grip with Payne-effect dynamic tests.

The Payne effect analyses the trend of the dynamic modulus ("storage modulus" E' or G' expressed in MPa) as a function of the deformation expressed in percentage (%), set at a test frequency and temperature. High elastic modulus values at low deformation rates ensure improved rolling resistance, while the elastic modulus at high deformation rates, where the values are lower compared to those at low deformation rates, can be correlated, in a tire, to the braking behaviour (wet grip).

Dynamic-mechanical analyses (DMA) were carried out with an apparatus of the TA Instrument type, set to a static deformation of 15% with bending specimen, in the following operating conditions: constant temperature of 60° C., frequency equal to 1 Hz, dynamic deformation from 0 to 10%.

Figure 2:
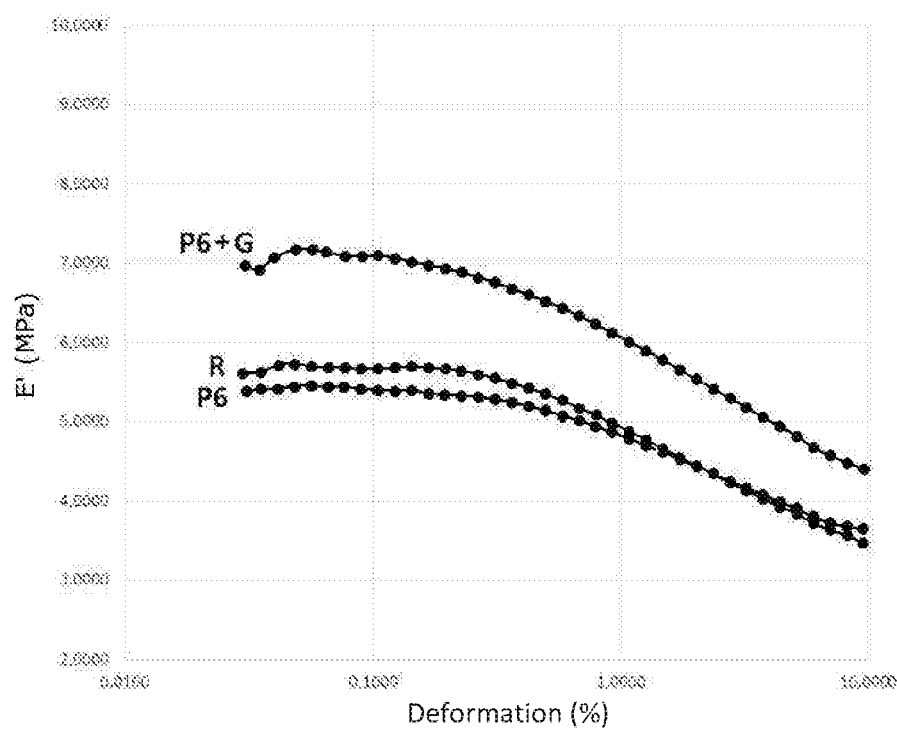

FIGS. 1 and 2 highlight the technical effect deriving from interaction between the graphene nanoplatelets representing component (D) and the elastomeric matrix (A). Observing the relative curves both for the composition P1 and for the composition P6 it is possible to note a marked increase in elastic modulus E' in the compositions containing graphene at low deformation rates.

The values of E' at low deformation rates are increased by 25% (composition P6+G) to over 55% (composition P1+G), while the compounds not containing graphene (P1 and P6) are comparable to the reference compound R.

Analysing the values with high deformation rates (close to 10%), it can instead be observed that the values of the decrease in elastic modulus are greater in the compounds containing graphene, producing a further advantageous technical effect.

Figure 3:
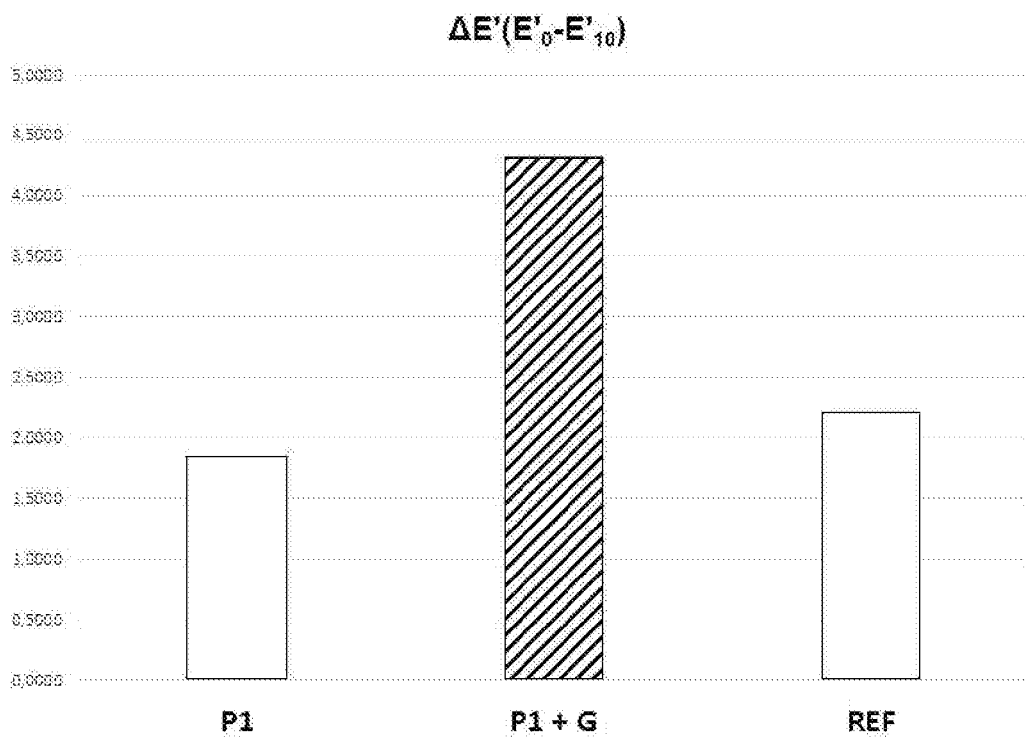
FIGS. 3 and 4 show that a difference in value (A) between a modulus at a deformation of around 0.03%, i.e. with practically no deformation (start of the curve), and a modulus at a deformation of 10% is greater in compounds containing grapheme.
Figure 4:
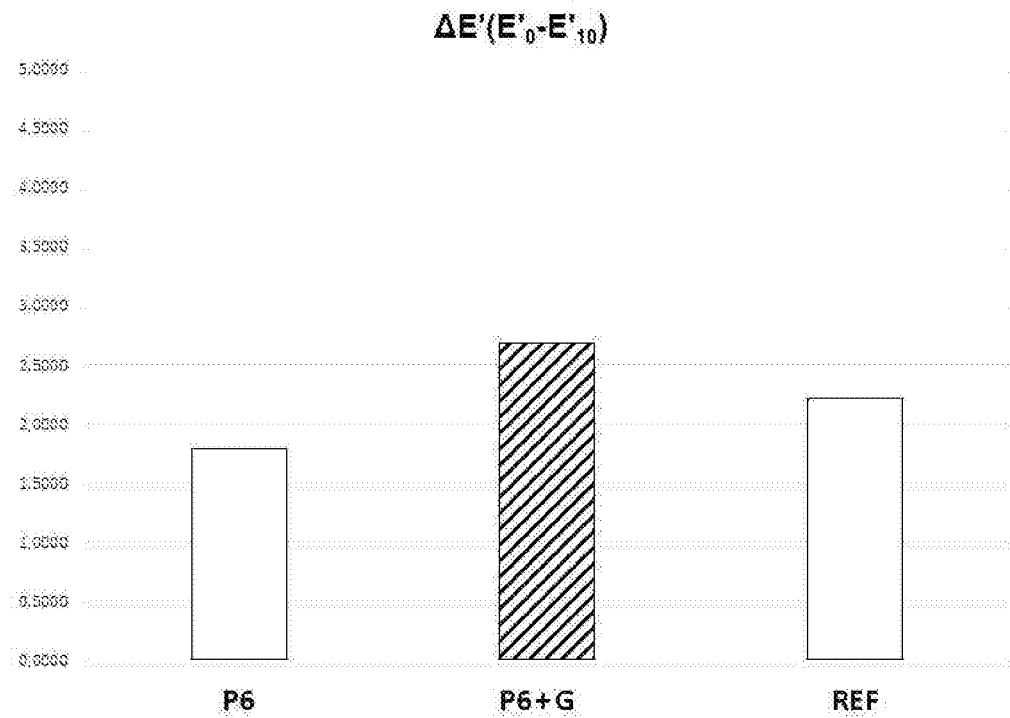

FIGS. 3 and 4 show that the difference in value (A) between the modulus at the deformation of around 0.03%, i.e. with practically no deformation (start of the curve), and the modulus at the deformation of 10% is greater in the compounds containing graphene, and this is a guarantee of improved behaviour in terms of wet grip compared to the corresponding compounds not containing graphene.

Based on the laboratory results, racing bicycle tires were manufactured with a tread based on the reference compounds R, P1 and P6 and the corresponding compounds with graphene defined component (D). These tires were manufactured in a bicycle tire factory, on the production line for racing tires, and were then tested in the Finnish laboratory WHEEL ENERGY, specialized in tests for racing bicycle wheels (http://www.wheelenergy.com/). This laboratory is used by the main manufacturers in the industry to evaluate dynamic behaviour (rolling resistance) and braking behaviour (grip).

Before performing the tests, the prototypes were subjected to a warm-up step for a duration of 30 minutes to take the tire to normal operating temperatures.

The prototypes were tested to determine the rolling resistance in the following conditions:
  diameter of the steel wheel of the test machine of 1200 mm;
  constant speed of the test machine of 40 km/h;
  weight applied to the tire 50 kg;
  pressure of the tire 8 bar.

The RR is measured in terms of absorbed energy values, expressed in Watt. The RR is better when the energy absorbed is the lowest possible.

At the end of testing of the various prototypes produced, the following results were obtained:

The tire with tread manufactured with the compound R, i.e. the commercial compound typically used for this application, was assigned an index value of 100, in order to be able to emphasize the differences of the other prototypes compared to the commercial product. Therefore, prototypes with an index lower than 100 are improved with respect to the prototype R.

Figure 5:
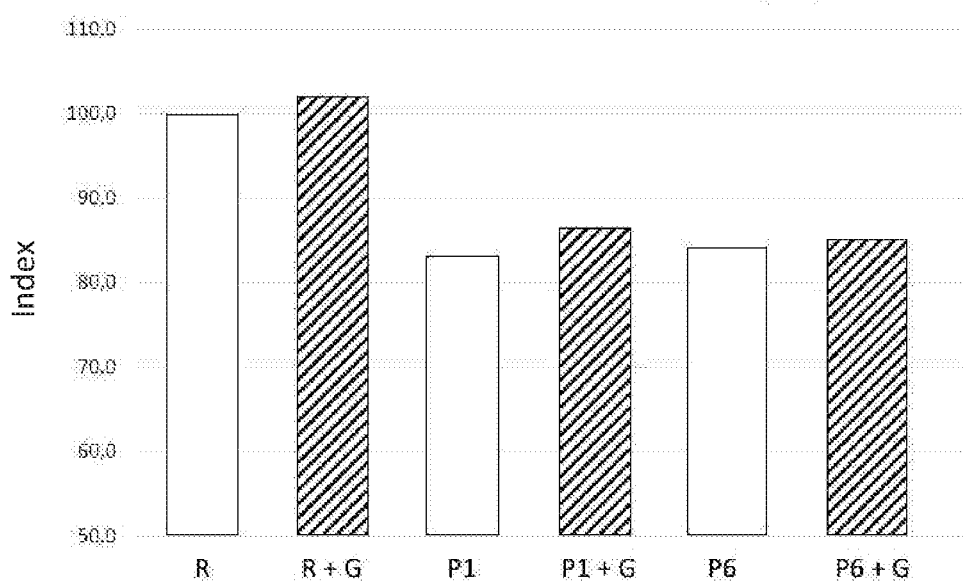
FIG. 5 compares rolling resistance values in histogram form in which compounds P1 and P6 show lower values of absorbed energy compared to compound R, due to a diversity in composition of the elastomeric component (A).

With reference to FIG. 5, which compares rolling resistance values in histogram form, compounds P1 and P6 show lower values of absorbed energy compared to compound R, due to the diversity in composition of the elastomeric component (A).

The addition of graphene (component D) to all the reference compounds causes a slight increase in the absorbed energy index, the extent of which is however negligible. Therefore, it can be considered that the RR values are substantially maintained.

The test conditions for determining wet grip on all the prototypes produced are as follows:
  weight applied to the tire 50 kg;
  pressure of the tire 8 bar.

The values obtained are expressed in kgf required to obtain an efficient wet grip. The grip is better when the braking force applied is as low as possible.

Figure 6:
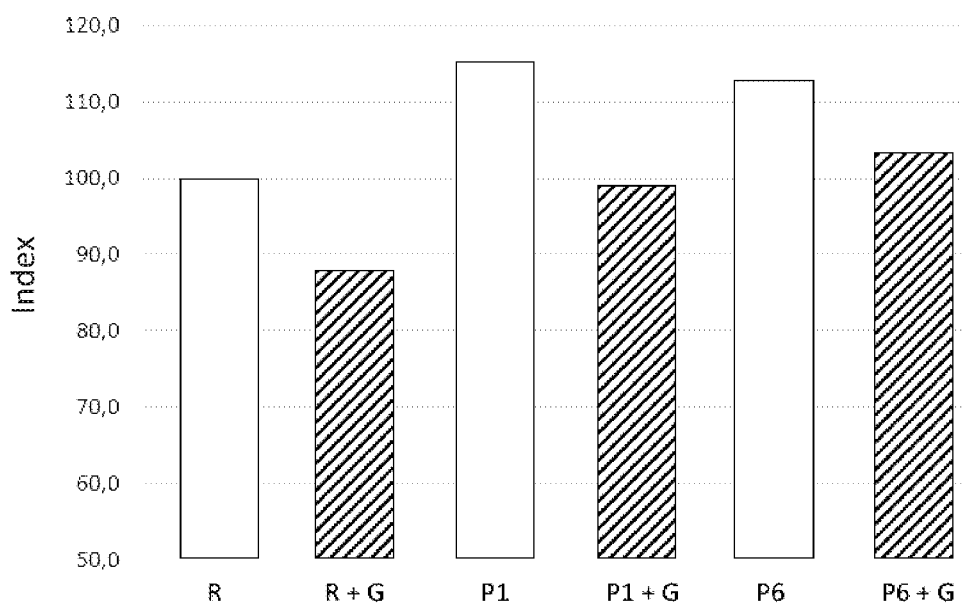
FIG. 6 compares wet grip values in histogram form in which compounds P1 and P6 show higher values of applied force compared to compound R.

With reference to FIG. 6, which compares wet grip values in histogram form, compounds P1 and P6 show higher values of applied force compared to compound R. However, the addition of graphene (component D) to all the reference compounds causes a marked decrease of the applied force index, particularly marked in the case of the compound P1.

It is therefore possible by choosing a suitable elastomeric composition (A)—see compounds R, P1 and P6—to set relatively high or low values of rolling resistance and/or wet grip, as a function of the properties desired for the tire and, through the addition of graphene, to improve the balance of these two properties, in particular to maintain the RR values and improve the wet grip values, which is impossible to achieve without the technical effect caused by the presence of component (D).

Example 2

Preparation of an Inner Tube for Tire

Compositions based on natural rubber with the addition of graphene (Component D) were produced, made up in the closed laboratory mixer with Banbury rotors, in order to analyse and evaluate their air/$O_2$/$N_2$ permeability, compared to a compound based on butyl rubber (IIR).

Due to its particular molecular structure, butyl rubber is the ideal polymer in order to obtain high performance in terms of air tightness, but with decreased basic mechanical properties compared to those of natural rubber. Therefore, compounds were produced with natural rubber (Compound NR), to which amounts of component (D) of 10 phr (Compound 1), 20 phr (Compound 2) and 30 phr (Compound 3), and a butyl rubber compound (Compound IIR), which is an isobutene copolymer with around 2% of isoprene, were added. All the compounds were made up/prepared in a Banbury laboratory mixer with a single cycle of 5 minutes.

The composition of the samples is shown in Table 2, where the ingredients are expressed in terms of parts by weight per 100 parts by weight (phr) of rubber.

TABLE 2

| | | NR | 1 | 2 | 3 | IIR |
|---|---|---|---|---|---|---|
| A | Natural rubber (NR) | 100 | 100 | 100 | 100 | — |
| B | Silica | — | — | — | — | — |
| C | Carbon black | — | — | — | — | 60 |
| D | Graphene | — | 10 | 20 | 30 | — |
| | Butyl rubber (IIR) | — | — | — | — | 100 |
| | Zinc oxide | 3 | 3 | 3 | 3 | 5 |
| | Stearic acid | 1.5 | 1.5 | 1.5 | 1.5 | 1 |
| | Hydrocarbon resins | — | — | — | — | 2 |
| | Blend of fatty acids | | | | | 1.15 |
| | Naphthenic oil | — | — | — | — | 16 |
| | Accelerants | 1.6 | 1.6 | 1.6 | 1.6 | 1.92 |
| | Cross-linking agents | 1.5 | 1.5 | 1.5 | 1.5 | 2 |

The graphene, component D, has lateral sizes (x-y), expressed as D90, from 10,000 to 15,000 nm and thickness (z) from 0.34 to 4 nm, and is manufactured by Directa Plus S.p.A. and marketed with the trade name Grafityre Pure G+.

Table 3 indicates some physical-mechanical properties of the formulations being compared.

The tensile properties and the modulus 100% were measured with the method ISO 37. The modulus 100% equals the stress, expressed in kg/cm², at 100% deformation inside the load/deformation curve obtained with the method ISO 37.

Hardness was measured with the method ISO 868.

Density was measured with the method ISO 1183 at 23° C.

It is evident that the physical-mechanical properties of the compositions with graphene are greatly superior compared to the butyl rubber reference (IIR).

TABLE 3

|  | NR | 1 | 2 | 3 | IIR |
|---|---|---|---|---|---|
| Modulus 100% (kg/cm²) | 1 | 9 | 24 | 32 | 18 |
| Tensile strength (kg/cm²) | 183 | 252 | 207 | 200 | 123 |
| Elongation at break (%) | 545 | 550 | 470 | 420 | 590 |
| Hardness | 41 | 47 | 57 | 62 | 54 |
| Density (g/cm³) | 0.96 | 0.99 | 1.04 | 1.08 | 1.14 |

Figure 7:
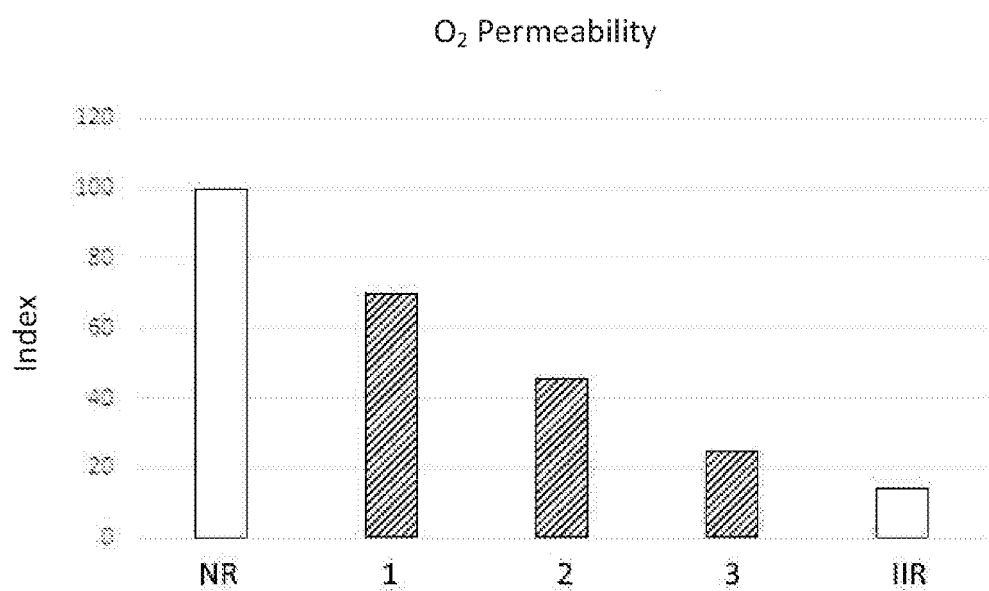
FIG. 7 shows values of oxygen permeability measured with a method ASTM D 1434 (anhydrous conditions).

The aforesaid compositions were used to mould membranes, on which oxygen permeability was measured with the method ASTM D 1434 (anhydrous conditions), the values of which are set down in FIG. 7. These values were normalized at the thickness of the specimen tested and set down in the figure as index with respect to the natural rubber compound without the addition of graphene, to which an index 100 is assigned.

Compound 3, based on NR containing 30 phr of graphene, shows values very close to the compound based on butyl rubber with industrial formulation containing 60 phr of filler and 16 phr of plasticizer. It was thus possible to obtain a composition with a lower specific weight, basic mechanical performance and permeability values respectively better than and comparable to the industrial compound.

The description above shows that the use of graphene nanoplatelets having the characteristics defined in the present invention represents an effective instrument for improving the characteristics of tire components.

The invention claimed is:

1. An elastomeric composition comprising, based upon parts by weight per 100 parts by weight of rubber (phr):
   (A) 100 phr of a blend of rubbers comprising a styrene-butadiene copolymer (SBR) and at least 20% by weight of an isoprene polymer;
   (B) from 10 to 30 phr of silica having a BET surface area measured using nitrogen of from 40 to 600 m²/g;
   (C) from 10 to 50 phr of amorphous carbon black; and
   (D) from 2 to 30 phr of graphene,
   characterized in that said graphene comprises nanoplatelets of graphene, wherein at least 90% of said nanoplatelets have a lateral size (x, y) from 500 to 15000 nm and a thickness (z) from 0.34 to 8 nm, wherein the C/O ratio is ≥100:1; and said nanoplatelets of graphene being at least one of i) free from surfactant or ii) comprising an amount of less than 1% by weight of surfactant deposited on the surface thereof;
   wherein said elastomeric composition exhibits:
   values of elastic modulus E' at deformation rates from 0.01 to 10% that are from 25 to 55% higher than the values of elastic modulus E' at the same deformation rates of the same elastomeric composition which does not comprise said graphene; and
   a decrease of elastic modulus at a deformation rate of about 10% which is greater in the elastomeric composition comprising said graphene than the decrease of elastic modulus shown by the same elastomeric composition which does not comprise said graphene at the same deformation rate of about 10%.

2. The elastomeric composition according to claim 1, characterized in that said graphene nanoplatelets of said component (D) have a C/O ratio ≥200:1.

3. The elastomeric composition according to claim 1, characterized in that said component (A) also comprises a 1,3-butadiene polymer (PB).

4. The elastomeric composition according to claim 3, characterized in that said isoprene polymer, said 1,3-butadiene polymer (PB) and said styrene-butadiene copolymer (SBR) represent at least 50% by weight of said component (A).

5. The elastomeric composition according to claim 1, characterized by further comprising an ethylene-propylene-diene terpolymer (EPDM).

6. The elastomeric composition according to claim 5, characterized in that said isoprene polymer and said styrene-butadiene copolymer (SBR) represent at least 50% by weight of said component (A), and said EPDM elastomer represents at least 30% by weight of said component (A).

7. The elastomeric composition according to claim 1, characterized in that said component (B) comprises from 10 to 20 phr of silica, that said component (C) comprises from 15 to 40 phr of amorphous carbon black, and that said component (D) comprises from 4 to 10 phr of graphene nanoplatelets.

8. A tire component comprising an elastomeric composition comprising, based upon parts by weight per 100 parts by weight of rubber (phr):
   (A) 100 phr of a blend of rubbers comprising a styrene-butadiene copolymer (SBR) and at least 20% by weight of an isoprene polymer;
   (B) from 10 to 30 phr of silica having a BET surface area measured using nitrogen of from 40 to 600 m²/g;
   (C) from 10 to 50 phr of amorphous carbon black; and
   (D) from 2 to 30 phr of graphene,
   characterized in that said graphene comprises nanoplatelets of graphene, wherein at least 90% of said nanoplatelets have a lateral size (x, y) from 500 to 15000 nm and a thickness (z) from 0.34 to 8 nm, wherein the C/O ratio is ≥100:1; and said nanoplatelets of graphene being at least one of i) free from surfactant or ii) comprising an amount of less than 1% by weight of surfactant deposited on the surface thereof;
   wherein said elastomeric composition exhibits:
   values of elastic modulus E' at deformation rates from 0.01 to 10% that are from 25 to 55% higher than the values of elastic modulus E' at the same deformation rates of the same elastomeric composition which does not comprise said graphene; and
   a decrease of elastic modulus at a deformation rate of about 10% which is greater in the elastomeric composition comprising said graphene than the decrease of elastic modulus shown by the same elastomeric composition which does not comprise said graphene at the same deformation rate of about 10%.

9. The tire component according to claim 8, wherein said component is a tread.

10. The tire component according to claim 8, wherein said component is selected from the group consisting of: an inner tube, a tubeless tire, an inner liner of the tubeless tire, and a carcass of a bicycle tire.

11. The tire component according to claim 10, characterized in that said component (D) comprises from 2 to 30 phr of graphene nanoplatelets.

12. The tire component according to claim 8, wherein said graphene nanoplatelets of the component (D) have a C/O ratio ≥200:1 and are free from surfactants, functionalizing agents, and coupling agents.

* * * * *